(12) United States Patent
Chen (10) Patent No.: US 7,038,909 B1
(45) Date of Patent: May 2, 2006

(54) CONTRACTIBLE AND EXTENTABLE LAPTOP COMPUTER EXTERNAL COOLER PAD

(75) Inventor: Robert Chen, Taipei (TW)

(73) Assignee: Win-Win Opto-Electronics Co., Ltd., Xindian (TW)

( * ) Notice: Subject to any disclaimer, the term of this patent is extended or adjusted under 35 U.S.C. 154(b) by 0 days.

(21) Appl. No.: 11/062,427

(22) Filed: Feb. 23, 2005

(51) Int. Cl.
*G06F 1/20* (2006.01)

(52) U.S. Cl. ............. 361/687; 361/686; 710/303

(58) Field of Classification Search ........... 361/687, 361/686; 710/303, 304
See application file for complete search history.

(56) References Cited

U.S. PATENT DOCUMENTS

| | | | | |
|---|---|---|---|---|
| 5,704,212 A * | 1/1998 | Erler et al. | ............ | 361/687 |
| 6,239,971 B1 * | 5/2001 | Yu et al. | ............ | 361/687 |
| 6,259,601 B1 * | 7/2001 | Jaggers et al. | ............ | 361/687 |
| 6,353,536 B1 * | 3/2002 | Nakamura et al. | ............ | 361/686 |
| 6,625,015 B1 * | 9/2003 | Yin | ............ | 361/686 |
| 6,687,123 B1 * | 2/2004 | Kitahara | ............ | 361/687 |
| 6,707,668 B1 * | 3/2004 | Huang | ............ | 361/687 |
| 6,738,256 B1 * | 5/2004 | Hsieh et al. | ............ | 361/687 |
| 2003/0058615 A1 * | 3/2003 | Becker et al. | ............ | 361/687 |
| 2005/0122678 A1 * | 6/2005 | Patel et al. | ............ | 361/687 |
| 2005/0174731 A1 * | 8/2005 | Lin | ............ | 361/686 |

* cited by examiner

*Primary Examiner*—Lisa Lea-Edmonds
(74) *Attorney, Agent, or Firm*—Birch,Stewart,Kolasch & Birch,LLP (57) ABSTRACT

A contractible laptop computer cooler comprising a main shell body with at least one cooling fans installed internally, two sliding sleeves each is installed on one side of the main shell body, each of the sliding sleeves wraps one side of the main body shell externally; a plurality of sliding slots are on top and bottom of the main body shell, the top and bottom of the sliding sleeves have a plurality of protruding ribs corresponding to the sliding slots; an expansion port is on the bottom of the main body shell to connect to other peripherals, such as USB Hub, Fireware (IEEE 1394), Network communication, multiple specification card reader and Port Replicater or a various of computer connectors collectively called Docking Station. Based on the structure, the present invention is easy for users to carry and store.

3 Claims, 9 Drawing Sheets

CONTRACTIBLE AND EXTENTABLE LAPTOP COMPUTER EXTERNAL COOLER PAD

BACKGROUND OF THE INVENTION

I. Field of the Invention

This invention relates generally to a laptop computer external cooler pad and, more specifically, to a Contractible laptop computer cooler that is easy to carry and store.

II. Description of the Prior Art

Figure 9:
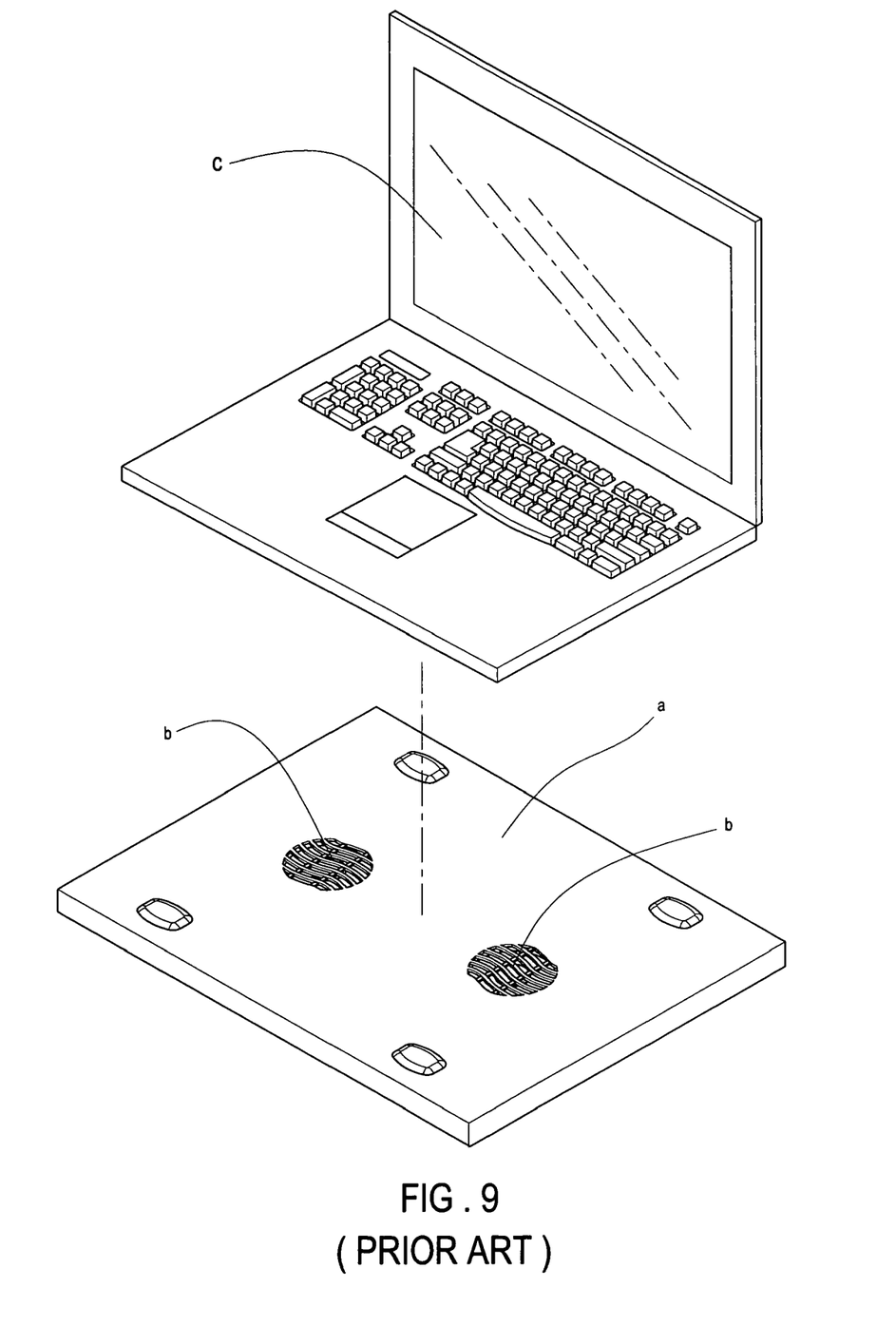
FIG. 9 is a perspective view of the prior art.

Heretofore, it is known that the external cooler pad of a laptop computer, as shown in FIG. 9, consists of a shell body a, the length and width of the shell body a is extendable to approximately same size as the laptop computer, more than one cooling fans b are installed inside the shell body a; the application of the known cooler of the laptop computer is to place a laptop computer c on top of the shell body a, the cooling fans b inside the shell body a reinforces air circulation beneath the laptop computer c, heat generated by the laptop computer c is brought out by air to achieve cooling effect.

However, while application, the laptop computer is placed c on top of the shell body, the cooler has the same length and width with laptop computer, such makes the cooler is bulky in physical size not so easy to carry around and store in bags for travelers, users might suffer troublesome.

SUMMARY OF THE INVENTION

It is therefore a primary object of the invention to provide a contractible laptop computer external cooler pad that is easy to carry and store in size.

In order to achieve the objective set forth, a contractible laptop computer external cooler pad in accordance with the present invention comprises a main shell body with at least one cooling fans installed internally, the major characteristic: two sliding sleeves each is installed on one side of the main shell body, these two sliding sleeves can be up and down opened or left and right opened, each of the sliding sleeve wraps one side of the main body shell externally; a plurality of sliding slots are on top and bottom of the main body shell, the top and bottom of the sliding sleeves have a plurality of protruding ribs corresponding to the sliding slots; an expansion port replicater is on the bottom of the main body shell to connect to other peripherals, such as USB Hub, Fireware (IEEE 1394), Network communication connecters, Audio/Video in and out, AC power, multiple specification card reader and various of computer connectors.

Based on the structure described above, the main shell body and the sliding sleeves can expand a certain distance to make the total length of the main shell body and the sliding sleeves longer or shorter of a laptop computer; after application, the main shell body and the sliding sleeves slides toward each other to ingather major portion of the main shell body into the sliding sleeves, the overall physical size is smaller than noncontractible cooler pad for users easy to carry and store.

BRIEF DESCRIPTION OF THE DRAWINGS

The accomplishment of the above-mentioned object of the present invention will become apparent from the following description and its accompanying drawings which disclose illustrative an embodiment of the present invention, and are as follows.

DESCRIPTION OF THE PREFERRED EMBODIMENT

Referring to FIG. 1 to FIG. 4, the present invention comprises a main shell body 1 with at least one cooling fans 10 installed internally, the major characteristic:

Two sliding sleeves 2 each is installed on one side of the main shell body 1, these two sliding sleeves can be either on up and down side of main shell body 1 or left or right of main shell body 1, each of the sliding sleeves 2 wraps one side of the main body shell 1 externally; a plurality of sliding slots 11 are on top and bottom of the main body shell 1, the top and bottom of the sliding sleeves 2 have a plurality of protruding ribs 20 corresponding to the sliding slots 11; a computer connecters Port Replicater 12 or a USB Hub or other peripherals connecters with same interface are on the bottom of the main body shell 1.

Figure 1:
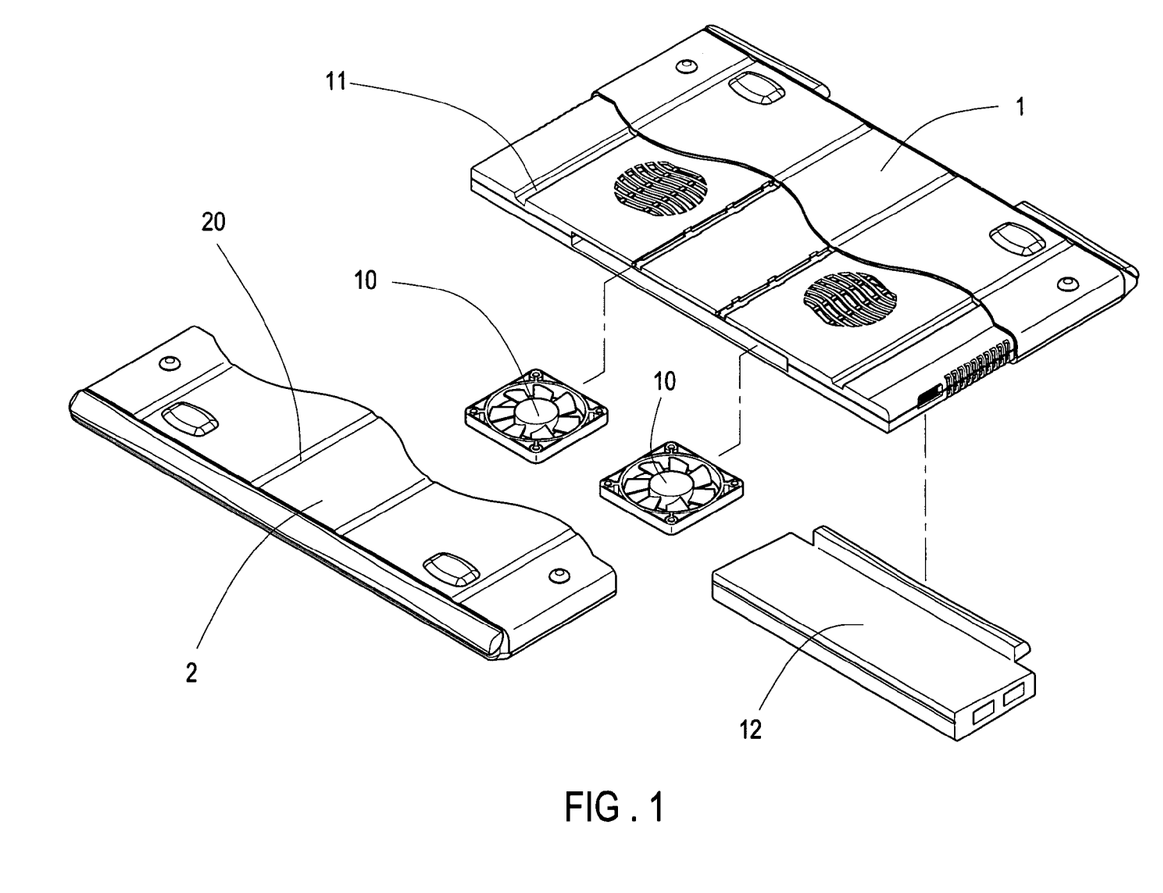
FIG. 1 is an assembly view of the present invention.
Figure 2:
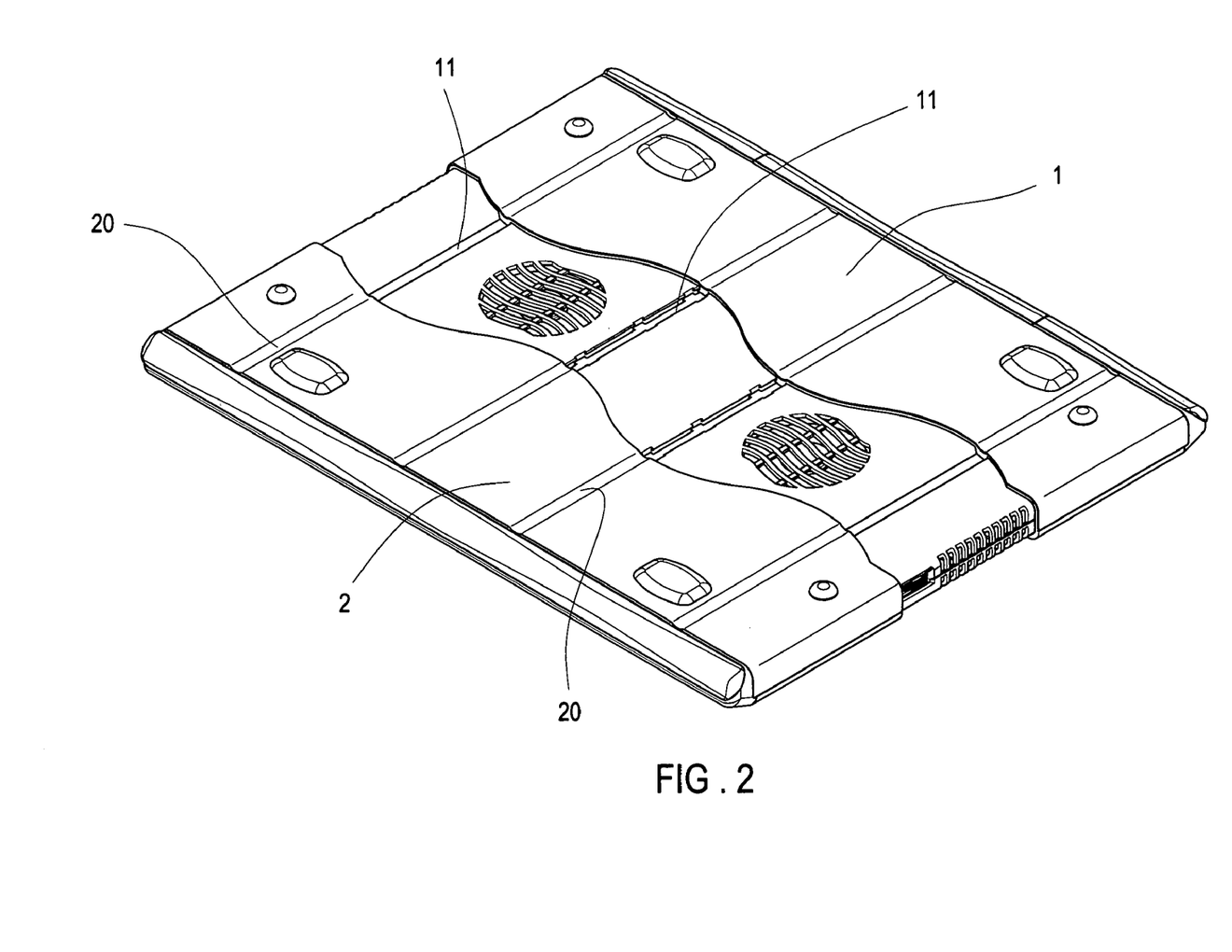
FIG. 2 is a perspective view of the present invention.
Figure 3:
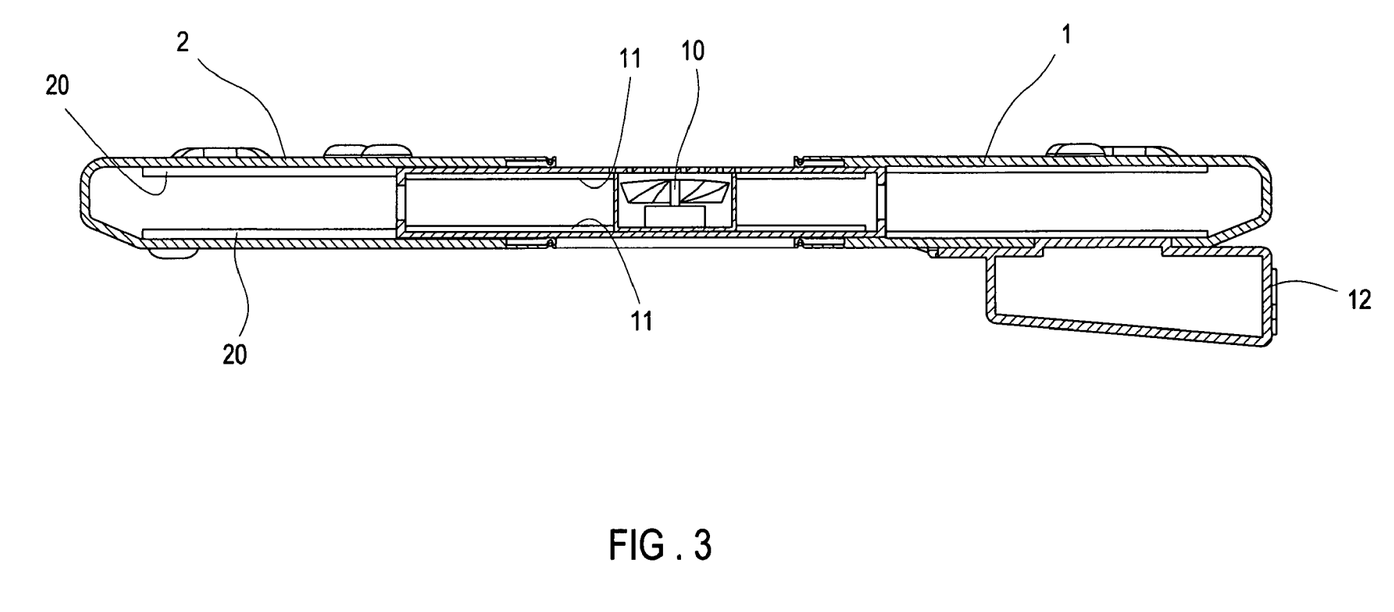
FIG. 3 is a cross-sectional view of the present invention.
Figure 4:
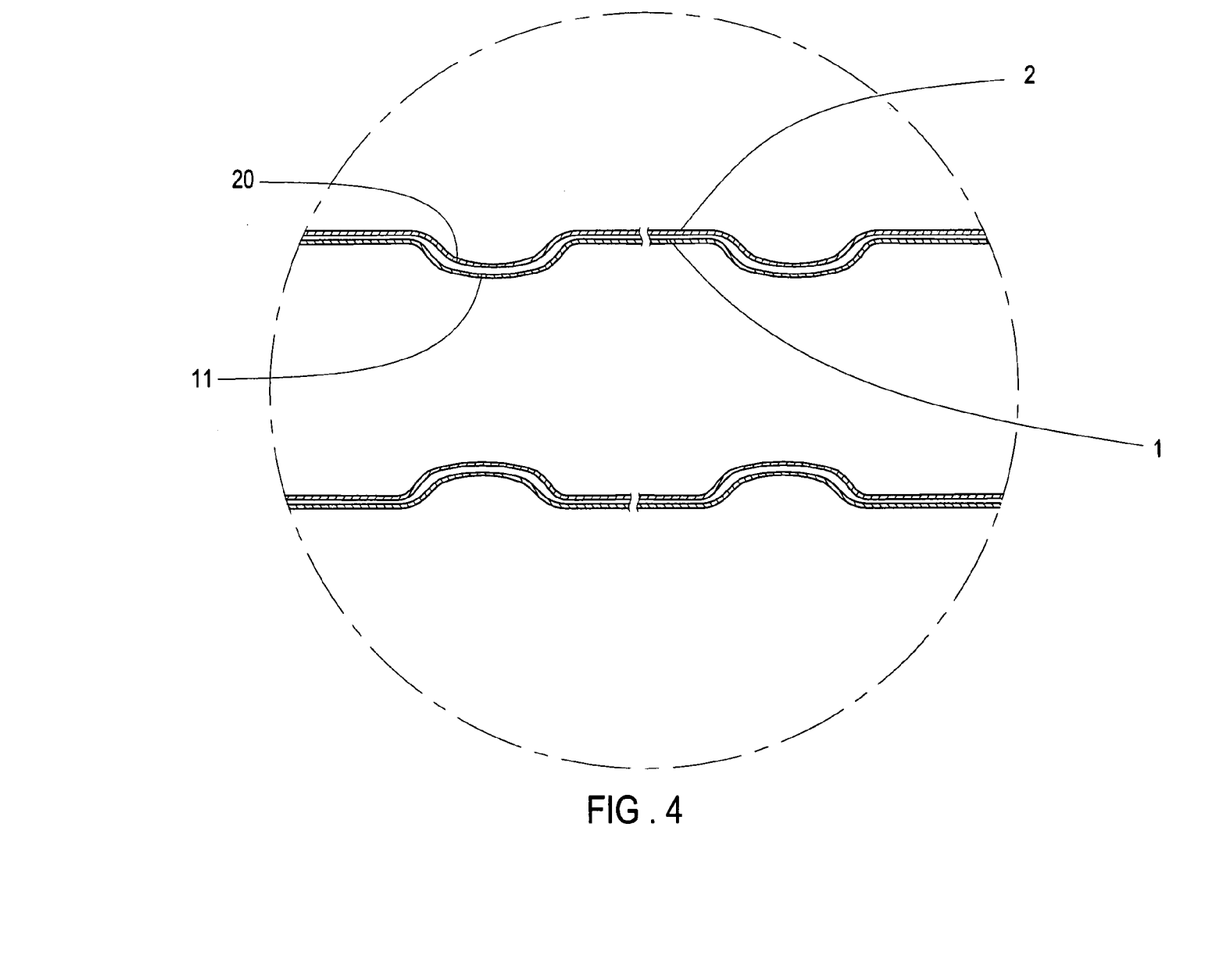
FIG. 4 is a cross-sectional view of a further embodiment of the present invention.
Figure 5:
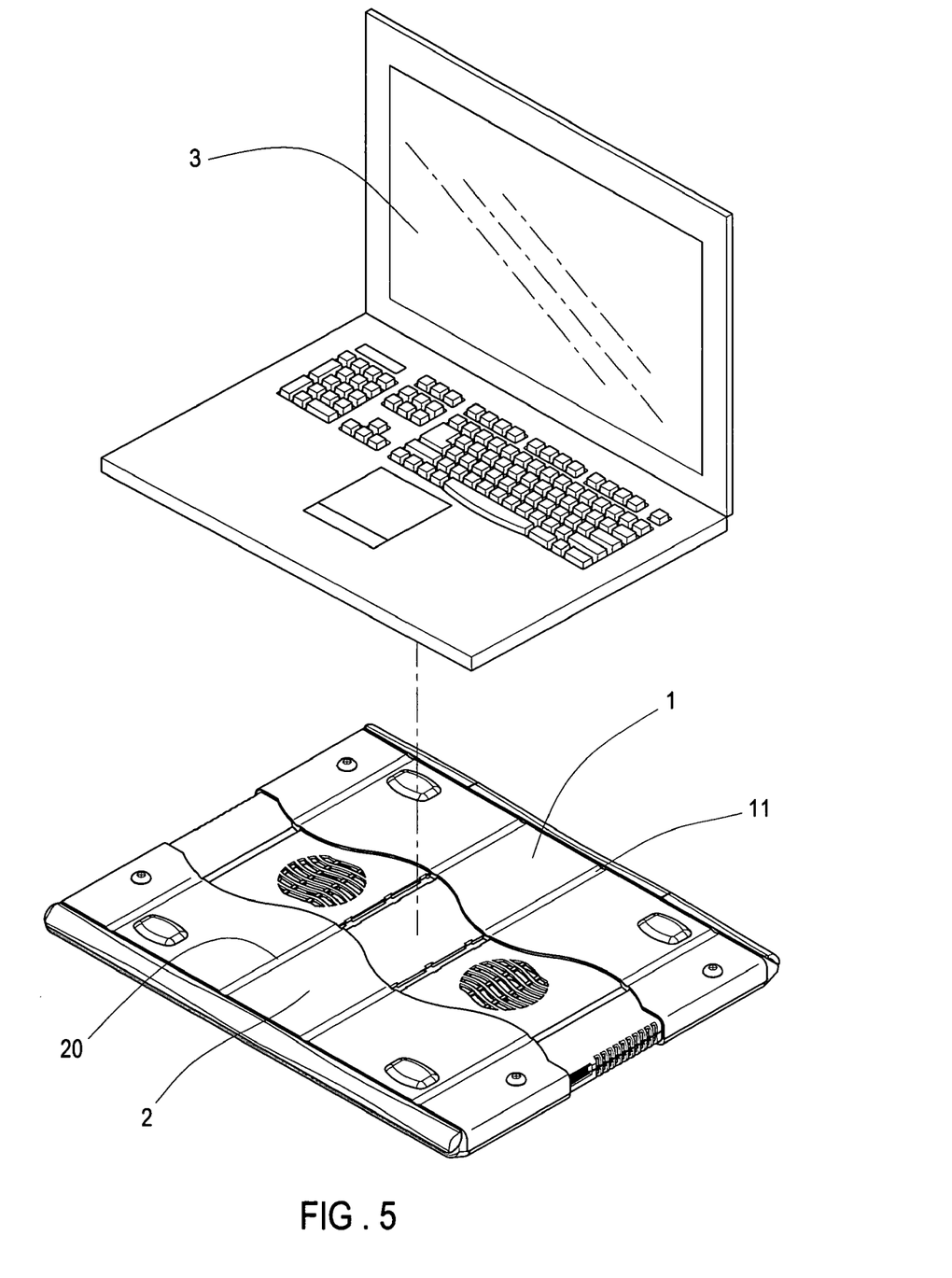
FIG. 5 is an application view of the present invention.

Based on the structure described above and referring to FIG. 5, while application, the sliding sleeve 2 is pulled out lengthwise from the main body shell 1; when pulling, the protruding ribs 20 slide inside the sliding slots 11, the sliding sleeves 2 slide opposite to the main body shell 1 to have the total length of the main shell body 1 and the sliding sleeves 2 equal to or longer than the length or the width of a laptop computer 3, the laptop computer 3 is placed on top of the main shell body 1 and the sliding sleeves 2, then the cooling fans 10 are switched on to reinforce air circulation beneath the laptop computer for cooling effect.

Figure 6:
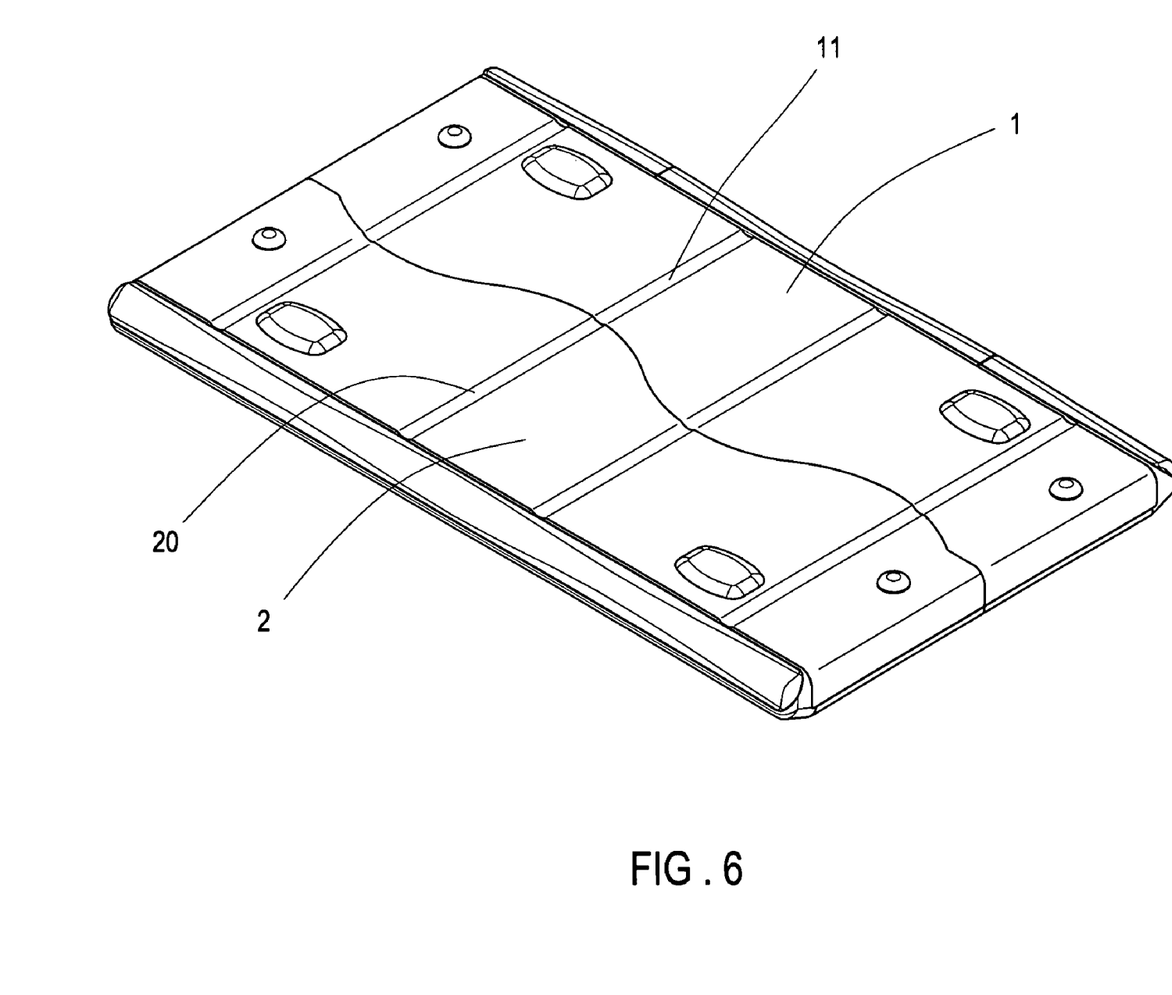
FIG. 6 is another second application view of the present invention.

Referring to FIG. 6, when finish application, users can apply sliding slots 11 and protruding ribs 20 to push the sliding sleeves 2 lengthwise and have both sides of the main body shell 1 contract inside the sliding sleeves 2, the total length of the contracted main shell body 1 and the sliding sleeves 2 is shorter, users can put the present invention inside a brief case without occupying too much space, when users want to carry the present invention out, the physical size is not too bulky and easy to carry.

Figure 7:
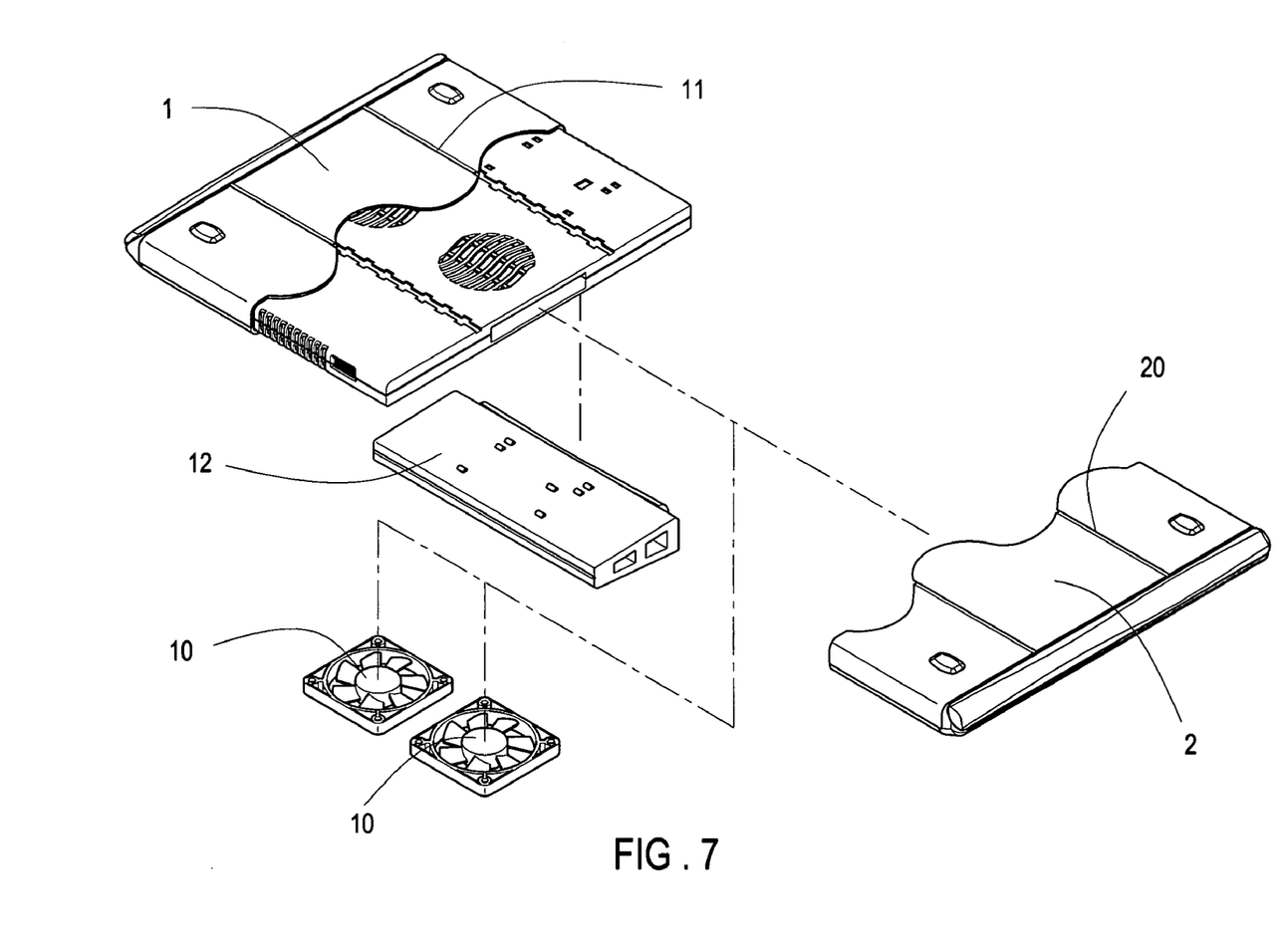
FIG. 7 and FIG. 8 are the application views of another example of the present invention.
Figure 8:
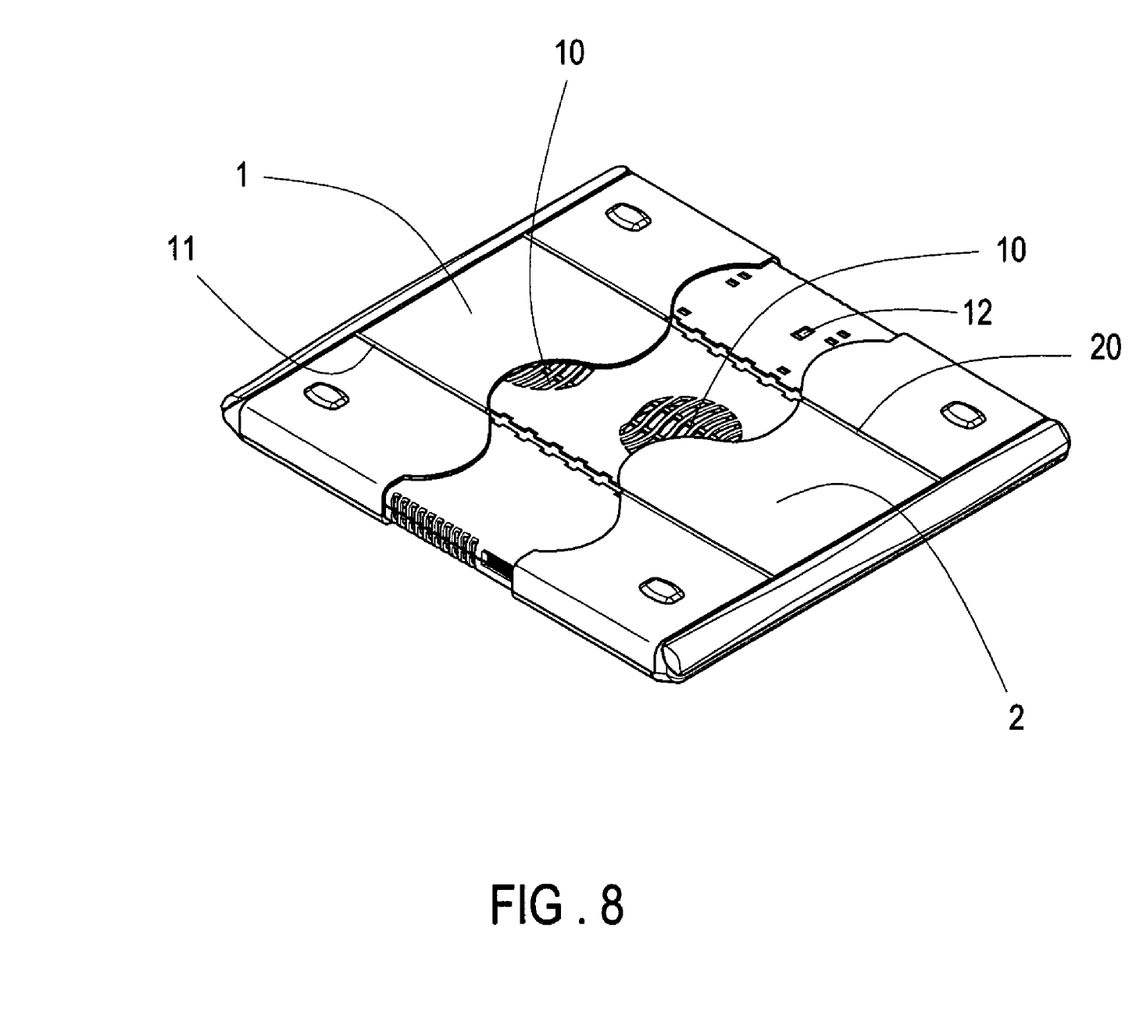

Referring to FIG. 7 and FIG. 8, the movement of the main body shell 1 and the sliding sleeves 2 can be transverse.

The Replicator 12 can be a USB (Universal Serial Bus) Hub, Fireware (IEEE 1394) Hub, EitherNet connecter, multiple specification card reader or a Ducking Station to expand connectivity.

While a preferred embodiment of the invention has been shown and described in detail, it will be readily understood and appreciated that numerous omissions, changes and additions may be made without departing from the spirit and scope of the invention.

What is claimed is:

1. A contractible laptop computer cooler comprising:
    a main shell body with at least one cooling fans installed internally, two sliding sleeves each is installed on one side of said main shell body, each of said sliding sleeves wraps one side of said main body shell externally, a plurality of sliding slots are on top and bottom of said main body shell, the top and bottom of said sliding sleeves have a plurality of protruding ribs corresponding to said sliding slots.

2. The contractible laptop computer external cooler pad recited in claim 1, wherein a computer connecters Port Replicater is on the bottom of said main body shell, said Port Replicater is a USB Hub, Fireware (IEEE 1394), EitherNet connector, a Hub, multiple specification card reader or other peripherals with same interface.

3. The contractible laptop computer cooler recited in claim 1, wherein a Port Replicator is on the bottom of said main body shell, said Replicator is also called a Ducking Station.

\* \* \* \* \*